United States Patent [19]

Greenhalgh

[11] Patent Number: 4,635,178
[45] Date of Patent: Jan. 6, 1987

[54] PARALLELED DC POWER SUPPLIES SHARING LOADS EQUALLY

[75] Inventor: Frank E. Greenhalgh, Amityville, N.Y.

[73] Assignee: CEAG Electric Corp., Hauppauge, N.Y.

[21] Appl. No.: 549,259

[22] Filed: Nov. 4, 1983

[51] Int. Cl.[4] .................................................. H02J 1/10
[52] U.S. Cl. ........................................ 363/65; 307/58; 307/82
[58] Field of Search ............... 323/234, 268, 269, 272; 363/65, 68, 69, 70, 71; 307/43, 52, 53, 58, 82

[56] References Cited

U.S. PATENT DOCUMENTS

| | | | |
|---|---|---|---|
| 3,521,150 | 7/1970 | Bates | 323/272 |
| 3,824,450 | 7/1974 | Johnson et al. | 323/272 |
| 3,840,797 | 10/1974 | Aggen et al. | 321/2 |
| 4,163,906 | 8/1979 | Shimamura | 307/39 |
| 4,194,147 | 3/1980 | Payne et al. | 323/284 |
| 4,270,165 | 5/1981 | Carpenter et al. | 307/58 |
| 4,359,679 | 11/1982 | Regan | 323/272 |
| 4,371,919 | 2/1983 | Andrews et al. | 363/65 |
| 4,468,722 | 8/1984 | Kammiller | 363/71 |

FOREIGN PATENT DOCUMENTS

| | | | |
|---|---|---|---|
| 2901396 | 9/1979 | Fed. Rep. of Germany . | |
| 1585102 | 9/1970 | France . | |
| 2056199A | 3/1981 | United Kingdom | 323/234 |
| 710033 | 1/1980 | U.S.S.R. | 363/65 |

*Primary Examiner*—Peter S. Wong
*Attorney, Agent, or Firm*—Cooper, Dunham, Griffin & Moran

[57] ABSTRACT

Disclosed is a system of paralleled switching power supplies designed and controlled to have substantially identical output voltages and impedances so as to share the load equally. The output voltage of each supply is controlled to decrease linearly with increased output current, and the individual power supplies and their control circuits are designed and controlled to behave as identically as possible under the expected service conditions such that, under any given set of conditions, the output voltages and impedances of the several individual power supplies can be expected to be substantially identical and therefore they can be expected to share the load substantially equally. Provisions are made to make the control of the individual power supplies substantially independent of variations in the resistance of the power cables connecting them to the common load.

1 Claim, 2 Drawing Figures

ALL VOLTAGES AND CURRENTS REFLECT A 0 TO 300 AMP LOAD CHANGE $E_o = E_{NOM} - 10^{-4} I_o$

PARALLELED DC POWER SUPPLIES SHARING LOADS EQUALLY

BACKGROUND AND SUMMARY OF THE INVENTION

The invention is in the field of power supplies connected in parallel to supply DC power to a common load. One nonlimiting example is in supplying a large computer requiring high current (e.g., thousands of amperes) at low voltage (e.g., 1.5 to 6 volts). Typically, power supplies of this type now use paralleled switching supplies each having a rated capacity of up to several hundred amperes. Such switching supplies typically draw AC power, rectify and filter it to unregulated DC power, convert the unregulated DC power to a high frequency pulse width modulated waveform (e.g., at 20 KHz), rectify this waveform to provide pulses whose duty cycle is controlled in accordance with the desired DC output voltage, and then filter the pulsed power to provide the desired output DC power. For example, AC power is rectified by a conventional rectifier bridge circuit, filtered by a conventional capacitor filter (or an LC filter) to produce unregulated DC power, and a switching transistor (or transistor network) converts this DC power to a high frequency pulse modulated waveform (i.e., a waveform having a positive pulse followed by a "zero"-volt interval, followed by a negative pulse, followed by another "zero"-volt interval, etc.). This waveform is applied to the primary of a transformer, and the signal at the secondary is rectified, to produce a unipolar pulse train with a duty cycle which is a function of the on and off times of the switching transistor(s). The pulsed power is filtered (e.g., by a conventional LC filter) to provide the desired DC output voltage.

Contemporary switching power supplies typically are most efficient at the 1,000 to 1,500 watt output range. Transistor current capabilities tend to limit standard converter topologies to the area of 1500 W. Therefore, when more DC power is needed, typically several such supplies are connected in parallel, so as to avoid the considerable difficulties attendant in attempting to design a single high output supply. For example, if a computer manufacturer requires 5 volts at 1,000 amperes, typically four power supplies rated at 5 volts and 300 amperes each would be connected in parallel. Ideally, each would supply 250 amperes at 5 volts to the common load, but in practice this is not the case because the respective output voltages, output impedances and temperature coefficients vary slightly but significantly enough as between the different power supplies to make equal sharing unlikely. The typical result is that the power supply which happens to have the highest output voltage at the time would deliver the total current it can until its output voltage is reduced by the output current limiting circuit typically used in such circumstances. Then the power supply with the next highest output voltage would deliver all the current it can until its current limit circuit also would reduce its output voltage, allowing another power supply to become active. As such current limit circuits typically limit at 110% of rated load (or 330 amperes in this example) the result with four paralleled power supplies is that at any one time it is likely three of them would be operating at approximately 330 amperes and a fourth would deliver very little or no current. Of course, it is known that when a power supply operates at its absolute maximum capability, its reliability is significantly reduced. Adding more power supplies in such a parallel system does not in itself solve the problem because under those conditions an extra power supply also is likely to operate either at maximum load or at little or no load.

There have been numerous attempts to remedy this problem. For example, circuits have been proposed which sense the output current of each power supply and send an error signal to the supplies (generally through the sense leads of the individual power supplies) to maintain current sharing. However, this introduces additional circuitry which must be designed for each application, as it is affected by factors such as the number of the paralleled supplies, temperature coefficients and the nature of the power cables from the individual power supplies to the common load, and thus becomes complex, unwieldly and difficult to stabilize, particularly as the number of individual power supplies increases. Attempts have also been made to use a current-driven control circuit which is capable of being paralleled to other supplies in such a manner as to seek to force sharing. However, it is then difficult to achieve stabilization as the number of power supply increases, and it is difficult to implement this approach when it is necessary that the paralleled power supplies provide a choice of output voltages. Examples of attempts to parallel power supplies are discussed in U.S. Pat. Nos. 3,521,150; 4,194,147; 4,359,679 and 4,371,919, the disclosures of which are hereby incorporated by reference.

In contrast to the attempts referred to above, a system and a process in accordance with the invention seek to avoid these and other paralleling problems without having to resort to external circuitry, and with providing the capability of working at selectable output voltages. In accordance with the invention, two or more power supplies are designed and built to be as identical as possible under the circumstances with regard to output voltage and output impedance over the required load and temperature ranges, and their output voltages are controlled in a way causing them to share the load as equally as possible. More particularly, a number of power supplies are paralleled to supply DC power to a common load, and each supply includes an internal circuit which monitors that supply's output current and controls that supply's output voltage to make it decrease linearly at a selected slope from a selected initial nominal level with increase of that supply's output current over a selected current range. The individual power supplies are matched to each other so that the initial nominal output voltage levels of the supplies are substantially identical to each other, and so are the slopes at which the output voltages drop with output currents. The power supplies include provisions for making the operation of the circuits which monitor and control the output voltages and currents, substantially independent of the characteristics (e.g., resistance) of the power cable connecting the power supplies' output terminals to the load. The power supplies embodying the invention connect to the load only through the conventional power cable and sense leads, and do not require any other, special connection.

DETAILED DESCRIPTION OF A PREFERRED EMBODIMENT

Figure 1:
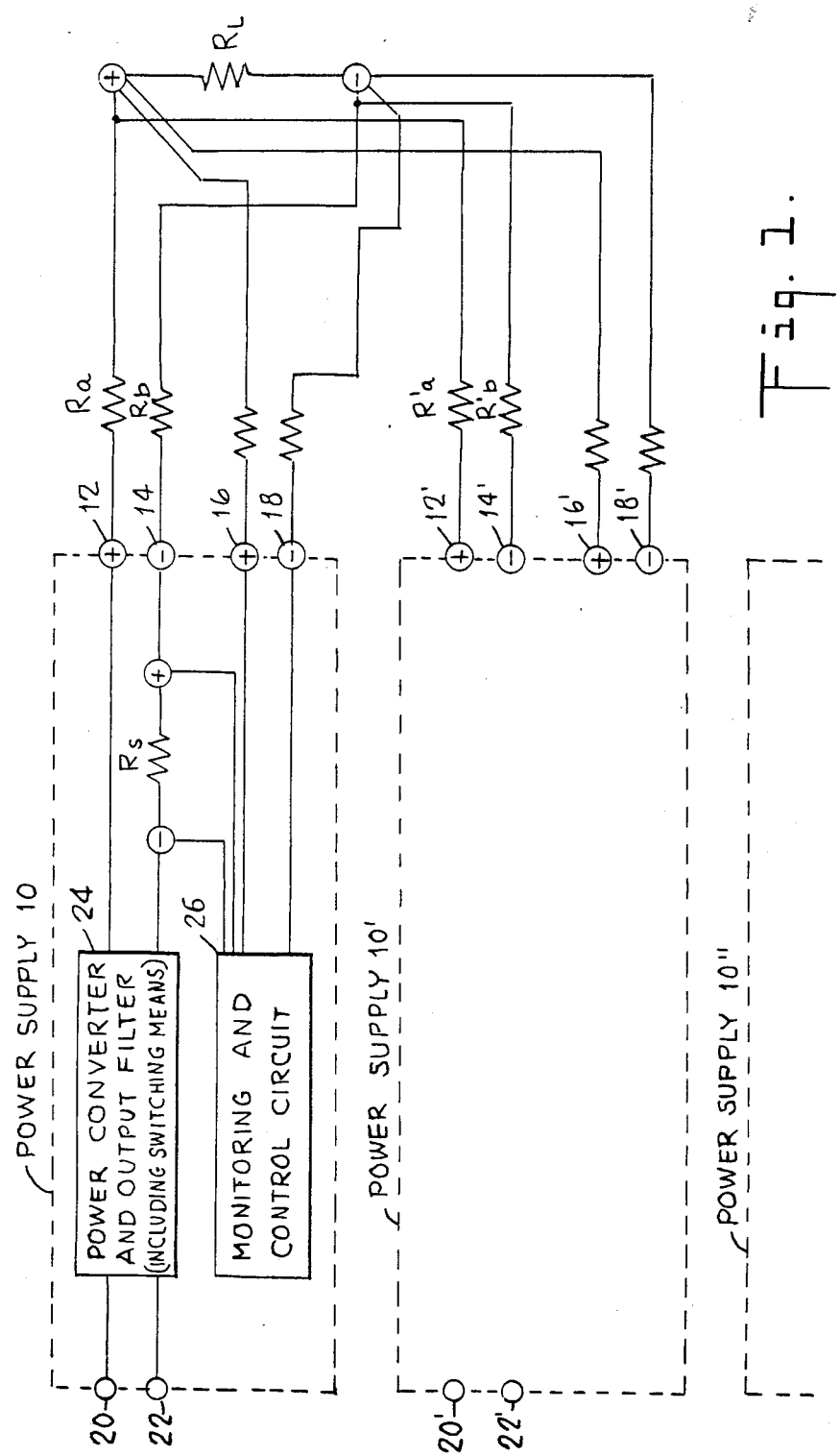
FIG. 1 is a generalized block diagram of an embodiment of the invention.

Referring to FIG. 1, a number of power supplies 10, 10', 10", etc. are paralleled to supply DC power to a common load RL. As the power supplies are substantially identical to each other, except for unavoidable variation of component characteristics, only power supply 10 is illustrated in more detail. It has a positive output terminal 12 for connection to the positive side of common load RL via a positive power cable having cable resistance Ra, a negative output terminal 14 for connection to the negative side of the common load via a negative power cable having cable resistance Rb, a positive sense input terminal 16 for connection to the positive side of the load via a sense lead having an unlabelled lead resistance, and a negative input sense terminal 18 for connection to the negative side of the common load via a negative sense lead having an unlabelled lead resistance. The power converter and output filter of power supply 10 receives power via input terminals 20 and 22. In the illustrated examples, terminals 20 and 22 are for connection to a source of unregulated DC power, for example the output of a circuit which is connected to an AC power source and rectifies and filters it, for example using a technique similar to that discussed in connection with FIG. 1 of said U.S. Pat. No. 4,163,906, where an AC source 1 is connected to the primary of a transformer 2 having a plurality of secondaries connected to rectifiers and smoothing capacitors. The other paralleled power supplies have corresponding terminals for receiving unregulated DC power, corresponding output terminals for connection to the common load through corresponding power cables, and corresponding input sense terminals for connection to the common load via corresponding sense leads. While FIG. 1 illustrates a system in which each output terminal is connected to the load via its own positive or a negative power cable, it should be clear that the invention is believed to be applicable to other types of connection as well—e.g., the case where the positive output terminals are connected to a positive bus which in turn is connected to the positive side of the load via a single cable, and the negative output terminals are connected to a negative bus which is connected to the negative side of the load via a single cable, and the case where use is made of a combination of individual cables and buses. Similarly, the input terminals 20, 22, 20', 22', etc. can be connected to a separate source for unregulated DC power for each of the power supplies 10, 10', etc., or to a common source of unregulated DC power through individual cables for the respective power supplies or through buses or through a combination of individual cables and buses.

As illustrated for power supply 10, each power supply includes a power converter and output filter 24 which, as in the case of the switching converters discussed in the cited patents, takes in unregulated DC power and converts it to regulated output DC power by means of an internal switching circuit whose duty cycle is controlled such that the output voltage would be at the desired level. In accordance with the invention, this duty cycle is determined by a monitoring and control circuit 26 which has two sets of inputs: one set is leads connected to the two sides of a current sense shunt resistor Rs in the power supply, and another set is a pair of leads connected to the sense input terminals of the power supply. The signal provided via the leads across shunt resistor Rs allows circuit 26 to keep track of the output current the power supply provides at the time, and the signal provided via the leads from the input sense terminal allows circuit 26 to keep track of the output voltage of that power supply. In response to these signals, and in response to an internal precision voltage reference, circuit 26 controls the duty cycle of the power converter and output filter 24 to provide the desired output voltage at output terminals 12 and 14 in a manner tending to ensure that the load is substantially equally shared between the several power supplies.

Figure 2:
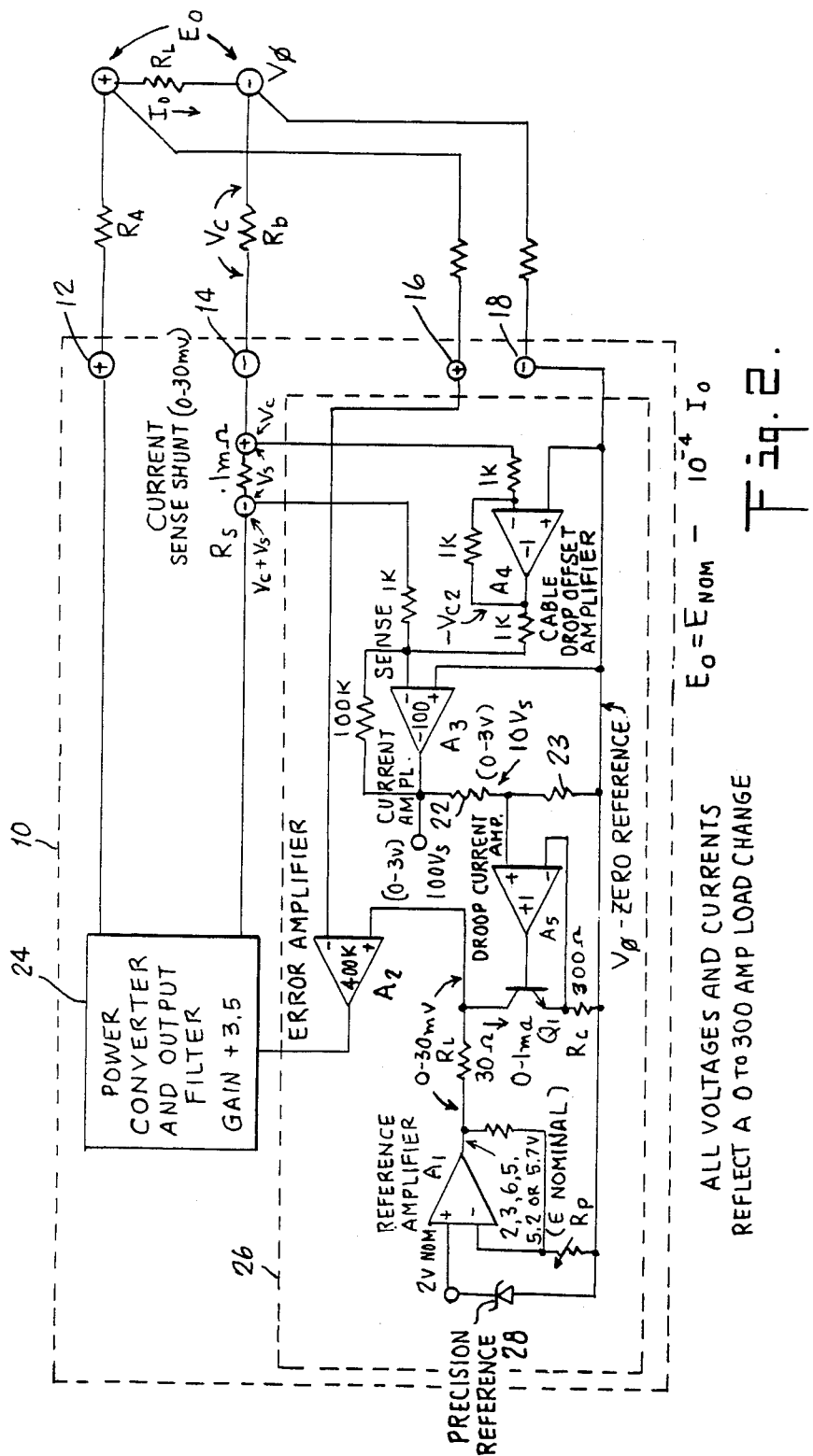
FIG. 2 is a more detailed block diagram of one of the power supplies shown as paralleled in FIG. 1.

Referring to FIG. 2, where like elements are identified by like reference numerals, monitoring and control circuit 26 includes a line connected to negative input sense terminal 18 to serve as a zero reference. A precision voltage reference circuit includes a precision reference 28 providing a selected nominal voltage relative to the zero reference to the positive input of a reference amplifier A1 and a precision variable resistor Rp (programming resistor) connected between the negative input of reference amplifier A1 and the zero reference and having its high side tied to the output of the reference amplifier through an unlabelled feedback resistor. In the specific illustrated example, precision reference 28 provides a 2-volt nominal output and, depending on the setting of programming resistor Rp, the output of the reference amplifier is at a nominal output voltage of 2, 3.6, 5, 5.2 or 5.7 volts. It should be understood that these voltage levels, as well as the voltage or current levels or the specific circuit components discussed below, and their values indicated in FIG. 2, apply only to a particular example, and are not meant to limit the scope of the invention, which is defined only by the appended claims.

An error amplifier A2 receives the nominal output voltage of the reference amplifier through a series resistor R1 at its positive input, has its negative input tied to positive sense input terminal 16, and supplies its output to power converter and output filter 24 to control its duty cycle, e.g. to control the duty cycle of a switching transistor in the manner discussed in the earlier cited patents. As is known, this duty cycle controls the voltage across the power supply's output terminals 12 and 14. A cable drop offset amplifier A4 has its positive input connected to the zero reference and its negative input connected to the terminal (load) side of shunt resistor Rs through a 1 K resistor and has a 1 K feedback resistor connected between its negative input and its output. A current sense amplifier A3 has its negative input connected to the output of the cable drop offset amplifier through a 1 K resistor and its positive input connected to the zero reference, and has a 100 K feedback resistor connected between its negative input and its output. A voltage divider composed of resistors R2 and R3 is connected between the output of the current sense amplifier and the zero reference, and a droop current amplifier A5 has its positive input connected to the junction of resistors R2 and R3, and its negative input connected to the zero reference through a resistor RC. The output of the droop current amplifier is connected to the base of a transistor Q1 whose collector is connected to the positive input of the error amplifier and its emitter is connected to the high side of resistor RC.

In the illustrated example, the arrangement and selection of components are such that the nominal output voltage of the reference amplifier (e.g., 5 volts) would be decreased linearly by an amount ranging from zero to 30 mv before being supplied to the positive input of the error amplifier as the output current through shunt resistor RS varies from zero to 300 amperes, so as to control power converter and output filter 24 such that the output voltage and terminals 12 and 14 similarly decreases linearly from 5 volts to 4.970 volts with increase of output current from zero to 300 amperes. For this purpose (and in this example of voltages, currents and components) as the value of shunt resistor RS is 0.1 milliohms there will be a voltage drop of 1 millivolt across the shunt resistor for every 10 amperes of output current flowing through the shunt resistor. Cable drop offset amplifier A4 compares the voltage drop Vc across the resistance Rb of the negative power cable to the voltage level of the zero reference, which is the same as the voltage level at the negative side of the load because the current in the sense lead is insignificant and the voltage across them therefore is so close to zero that it can be neglected. Cable drop offset amplifier A4 therefore compares the voltage drop across the cable from terminal 14 to the voltage at the negative side of the load and provides an output equal in magnitude to, but of opposite polarity of, the voltage drop across the power cable which is designated Vc in the drawing. This voltage (−Vc) is then summed in current sense amplifier A3 with the voltage at the negative side of the shunt resistor Rs, which is equal to the sum of Vc and Vs (the voltage drop across the shunt resistor). The input to amplifier A3 therefore is [−Vc+(Vc+Vs)], which should add up to Vs. The output of A3 (in view of the indicated gain of amplifiers A3 and A4) is therefore 100 times the voltage Vs across the shunt resistor, i.e. it varies from 0 to 3 volts as the output current through shunt resistor Rs varies from 0 to 300 amperes. The voltage divider made up of resistors R2 and R3 divides the output of amplifier A3 by 10, and the voltage at the junction of resistors R2 and R3 therefore varies from 0 to 0.3 volts as the output current varies from 0 to 300 amperes. Amplifier A5 in conjunction with transistor Q1 acts to maintain this voltage across resistor Rc, which is a 300 ohm resistor. As the voltage to the positive input of amplifier A5 varies from 0 to 300 millivolts, the current through resistor RC varies from 0 to 1 milliamperes, because the collector current of transistor Q1 is essentially equal to the current through Rc. The current drawn through the 30 ohm resistor R1 therefore causes the reference voltage provided at the output of amplifier A1 to decrease by an amount varying from 0 to 30 millivolts (for increase of the output current from 0 to 300 amperes) before it is delivered to the positive input of the error amplifier. Of course, the error amplifier controls power converter and output filter 25 so as to force the negative input of amplifier A2 to track its positive input, i.e. to force the voltage across terminals 12 and 14 to track the voltage supply to the positive input of error amplifier A2.

The effect is to generate an absolute reference to the positive input of error amplifier A2 which can be used to maintain the output at the customer's load at precisely the nominal output voltage of reference amplifier A1 when the output current is zero, and to decrease the value of the absolute reference at the positive input of error amplifier A2 such that the output at the customer's load will decrease ("droop") from zero to 30 millivolts below the nominal voltage output of reference amplifier A1 as the output current increases from zero to 300 amperes. The net effect is to provide a power supply whose Thevenin equivalent is a voltage source of the desired output voltage with a series impedance of 0.1 milliohms. This is substantially what is seen at the customer's load terminals, and functions as such regardless of reasonable changes of cable resistance Ra and Rb. The system operates as described, provided with the nominal output voltage at the output of reference amplifier A1 remains sufficiently stable over the operating temperature range and the line and load effects and over time. Similarly, error amplifier A2 should produce no unacceptable offset error over the same operating parameters. The components should be chosen and interconnected such that the output voltage across terminals 12 and 14 of each power supply can be maintained to within about 3 millivolts of the desired output over a temperature range of 0° to 70° C., a variation of AC input voltage of 185 to 250 volts, and a half a volt variation in the resistance of the power cables. The output of reference amplifier A1, and the above indicated stability parameters should be substantially identical as between the several power supplies paralleled to supply a common load in order for the load to be shared substantially equally among the individual power supplies.

One particular advantage of the system described above is that each power supply is self-contained and is regulated by internal circuitry independent of reasonable variations in the manner in which its output terminals are connected to the customer's load. Because of this, it is not necessary to customize a power supply system to a particular application, and it is not necessary to make adjustments when the number of paralleled power supplies is changed. Moreover, as each individual power supply is self-contained in terms of regulating its output voltage, there is no need to have external control circuits, or circuits which keep track of the difference between the outputs of the individual supplies, as in prior proposals. What makes the individual power supplies in the invented system share the load substantially equally is the fact that their internal characteristics are matched and are kept sufficiently stable to present substantially identical output voltages and output impedance to the load under any given set of conditions within the design range.

While a specific example was described in detail above to teach those skilled in the art how to make and use the invention, it should be clear that this is but an illustration of the invention and that the scope of the invention is limited only by the invented claims.

I claim:

1. A power supply system comprising:
    a plurality of paralleled power supplies each having a positive output terminal and a negative output terminal for connection across said load via power cables, a current sense shunt resistor at the power supply side of the negative output terminal, and a positive sense input terminal and a negative sense input terminal for connection across the load via sense leads;
    each power supply further having a monitoring and control circuit which is connected to the negative input sense terminal to use it as a zero reference and comprises a precision reference providing a selected nominal voltage relative to the zero reference, a reference amplifier receiving the nominal voltage at its positive input, a programming resistor connected between the negative input of the reference amplifier and the zero reference and having selectable resistance, an error amplifier, a series resistor connected between the output of the reference amplifier and the positive input of the error amplifier, a lead connecting the negative input of the error amplifier to the positive sense input terminal, the output of the error amplifier being connected to control the voltage across the power supply's output terminals, a cable drop offset amplifier having its positive input connected to the zero reference and its negative input connected to the terminal side of the shunt resistor, a current sense amplifier having its negative input connected to the output of the cable drop offset amplifier and its positive input connected to the zero reference, a voltage divider connected between the output of the current sense amplifier and the zero reference, a droop current amplifier having its positive input connected to the voltage divider and its negative input to the zero reference, a transistor having its collector connected to the positive input of the error amplifier, its emitter connected to the zero reference and to the negative input of the droop current amplifier and having its base connected to the output of the droop current amplifier;

wherein the recited elements are selected and interconnected to cause the voltage across the power supply's output terminals to decrease linearly from a selected level with increase of current flow through the shunt resistor over a selected current range and to maintain the output voltage vs. current characteristics of the respective power supplies substantially the same as between different power supplies to thereby cause substantially equal load sharing.

* * * * *